United States Patent [19]

Miles, II

[11] 3,780,868

[45] Dec. 25, 1973

[54] PRESSURE FILTER HAVING DEPENDING TUBULAR FILTER ELEMENTS

[75] Inventor: Harry Victor Miles, II, Westport, Conn.

[73] Assignee: Dorr-Oliver Incorporated, Stamford, Conn.

[22] Filed: Apr. 19, 1972

[21] Appl. No.: 245,636

Related U.S. Application Data

[63] Continuation of Ser. No. 54,216, July 13, 1970.

[52] U.S. Cl................ 210/333, 210/457, 210/497
[51] Int. Cl.......................................... B01d 29/24
[58] Field of Search................ 210/495, 471, 457, 210/323, 333, 497, 489; 55/377, 378, 379, 381; 29/419

[56] References Cited
UNITED STATES PATENTS

| | | | |
|---|---|---|---|
| 1,683,786 | 9/1928 | Long | 210/471 |
| 1,578,314 | 3/1926 | Herold | 210/471 |
| 1,882,221 | 10/1932 | Kunkely | 55/387 X |
| 3,356,215 | 12/1967 | Miles, Jr. | 210/333 X |
| 3,394,815 | 7/1968 | Harms et al. | 210/333 X |
| 3,419,151 | 12/1968 | Smith et al. | 210/499 X |

Primary Examiner—Frank A. Spear, Jr.
Attorney—Burtsell J. Kearns et al.

[57] ABSTRACT

A pressure filter unit equipped with depending tubular filter elements comprising a tubular filter fabric element surrounding a rigid tubular liquid-permeable backing member, featuring an improved simple lead proof connection between the top ends of the filter elements and the supporting tube plate in the filter unit, which connection is resistant to backwash pressure supplied to the tubular filter elements through the upper open ends thereof.

14 Claims, 15 Drawing Figures

INVENTOR.
HARRY V. MILES
BY Theodore M. Jablon
ATTORNEY.

INVENTOR.
HARRY V. MILES
BY Theodore M. Jablon
ATTORNEY.

INVENTOR.
HARRY V. MILES
BY Theodore N. Jablon
ATTORNEY.

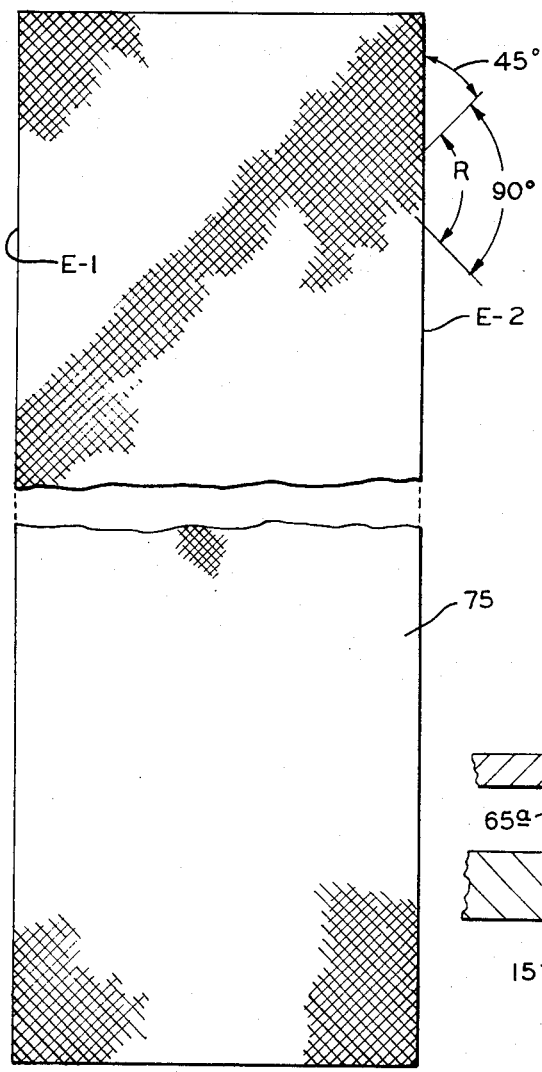
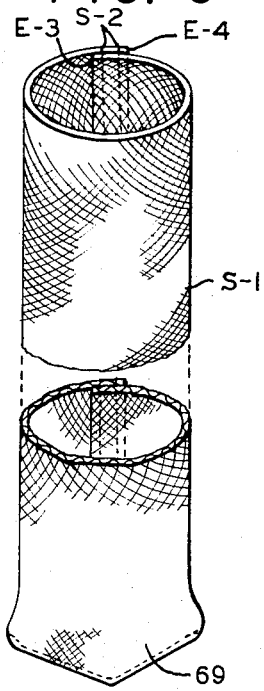
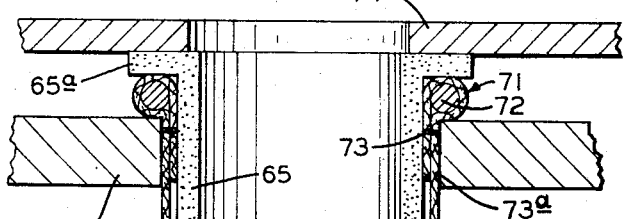
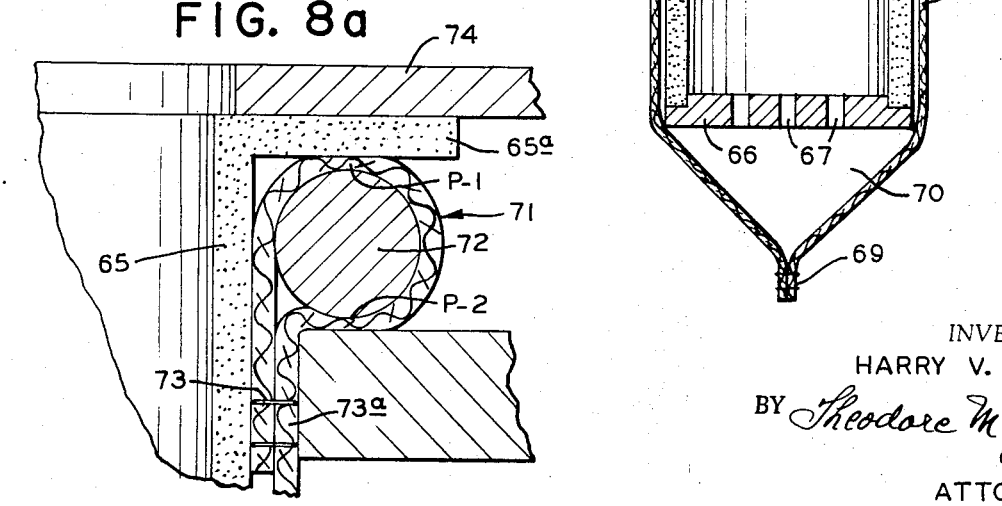

PRESSURE FILTER HAVING DEPENDING TUBULAR FILTER ELEMENTS

This is a continuation, of application Ser. No. 54,216, filed July 13, 1970.

This invention relates to pressure filters having depending tubular filter elements contained in a pressurized filter tank.

In this type of pressure filter, the upwardly open ends of the tubular filter elements are connected to a tube plate which divides the tank into a lower compartment receiving the pulp, sludge, or suspension to be filtered under pressure, and an upper compartment receiving the filtrate liquid passing through the tube plate and the upwardly open ends of the filter elements.

The filter elements of the type herein contemplated comprise a tubular sleeve of filter material or filter cloth loosely surrounding a rigid tubular liquid-permeable or porous member the upper flanged end of which together with the associated end of the filter sleeve must be sealingly connected to the tube plate of the filter unit.

More particularly, this invention relates to improvements in the tubular filter elements themselves. One of the objects is to provide an improved leak proof connection between the tube plate and the filter elements. Another object is to provide a simple and inexpensive filter sleeve adapted to provide said leak proof connection.

The underlying problem and the objects of this invention will be more readily understood by reference to the U.S. Pat. to Miles No. 3,356,215 disclosing and describing a filtration-thickening unit herein shown for the purpose of illustration to embody this invention. Such a filter unit comprises a number of pressure filtration zones arranged in parallel, each zone comprising a group of said depending filter elements. These zones may be operated in a filtration cycle whereby the filter elements in one zone at a time, are subjected to backwashing, while the filter elements in all the other zones continue under conditions of pressure filtration. Inasmuch as filtration and backwashing thus proceed simultaneously in this filter unit, backwash liquid must be supplied to the filtration zones sequentially at a pressure greater than the filtration pressure. During backwashing, the layer of sludge solids collected on the respective filter elements is released or dislodged and sinks to the bottom of the tank, whence the collected thickened matter may be withdrawn periodically.

More particularly, in the filter-thickening unit herein exemplified each of the pressure filtration zones comprises a group of depending tubular filter elements having their upper ends connected to a tube plate so that filtrate liquid forced into the interior of the filter elements will pass upwardly through the tube plate from each filtration zone into a separate filtrate receiving chamber, while a layer of sludge solids builds up externally upon the filter elements. A hollow cover member cooperating with the tube plate is subdivided by radial partitions defining said separate filtrate receiving chambers. These chambers in turn define the number of the pressure filtration zones in the tank. A valve chamber mounted atop the radially partitioned cover member contains a rotating valve conduit or duct connected to a supply of wash liquid under pressure. Rotation of this valve duct supplies the wash water sequentially to each of the chambers in the cover member, and thus sequentially to the groups of filter elements in the respective filtration zones. Thus in the operating cycle of this machine, each of the pressure filtration zones is subjected to a period of backwashing, while pressure filtration continues in all of the other zones. Feed suspension under pressure is supplied continuously to the tank, while filtrate liquid discharges continuously through the valve chamber which houses the rotating duct.

In the aforementioned patent to Miles, the porous rigid tube of the filter element has a flange at its upper end. The upper end of the filter sleeve surrounding the tube is connected to a flanged member of flexible rubber material having a neck portion peripherally connected as by sewing to the filter cloth material of the filter sleeve. When this composite filter element is in place, both the rigid flange of the porous tube and the flexible flange or gasket are confined or compressed between the top face of the tube plate and a sector-shaped retainer plate, thus securing all the filter elements communicating with the respective sector-shaped filtrate receiving chamber.

This earlier manner of mounting and securing the filter element was subject to leakage with ensuing turbidity of the filtrate liquid, due to the rubber gasket developing a compression set, or due to an occasional rupture partially severing the aforementioned shaped gasket member from the material of the filter sleeve.

This invention avoids such leakage or rupture, by the provision of a filter sleeve having its upper open end specially prepared with an annular bead radially overhanging from the sleeve, said bead being confined between the tube plate and the retainer plate. More in particular, this bead comprises a ring member of non-compressible material enclosed or enveloped by the upper terminal portions of the filter sleeve material or filter cloth itself. The filter cloth enveloping the non-compressible ring member provides an effective and longlasting seal against leakage, eliminating the causes of compression set or rupture.

In a practical embodiment a filter cloth material in forming the filter sleeve is employed in such a manner that the threads of the fabric extend spirally relative to the longitudinal sleeve axis, thus rendering the sleeve expandable, thereby allowing the ring member to be inserted into the sleeve, even though the ring diameter is substantially greater than the sleeve.

The inserted ring member is positioned in a plane transversal of the sleeve axis, forming an outward annular bulge in the transversely stretchable filter sleeve. The non-extended free end portion of the filter material is turned inwardly through the ring member and secured to the adjoining surrounding portion of the filter sleeve material below the ring. The non-compressible ring member thus enveloped by the transversely stretched filter media forms a radially outwardly overhanging bead which when compressed prevents leakage and avoids rupture.

Specific features lie in the provision of a simple and inexpensive filter sleeve wherein the filter cloth of the sleeve is expandable, and in a method for making such a sleeve.

As this invention may be embodied in several forms without departing from the spirit or essential characteristics thereof, the present embodiment is illustrative and not restrictive. The scope of the invention is defined by the appended claims rather than by the description preceding them, and all embodiments which fall within the meaning and range of equivalency of the claims are therefore intended to be embraced by those claims.

FIG. 8 is a greatly enlarged vertical sectional detail view of the tubular filter element secured in place, featuring the specially prepared beaded end of the filter sleeve.

FIG. 9 shows the filter sleeve incomplete, featuring a filter cloth streatchable transversely as well as longitudinally due to the spiral direction of the thread.

FIG. 10 shows a blank strip of the filter material to be formed into the filter sleeve of FIG. 9.

Figure 1:
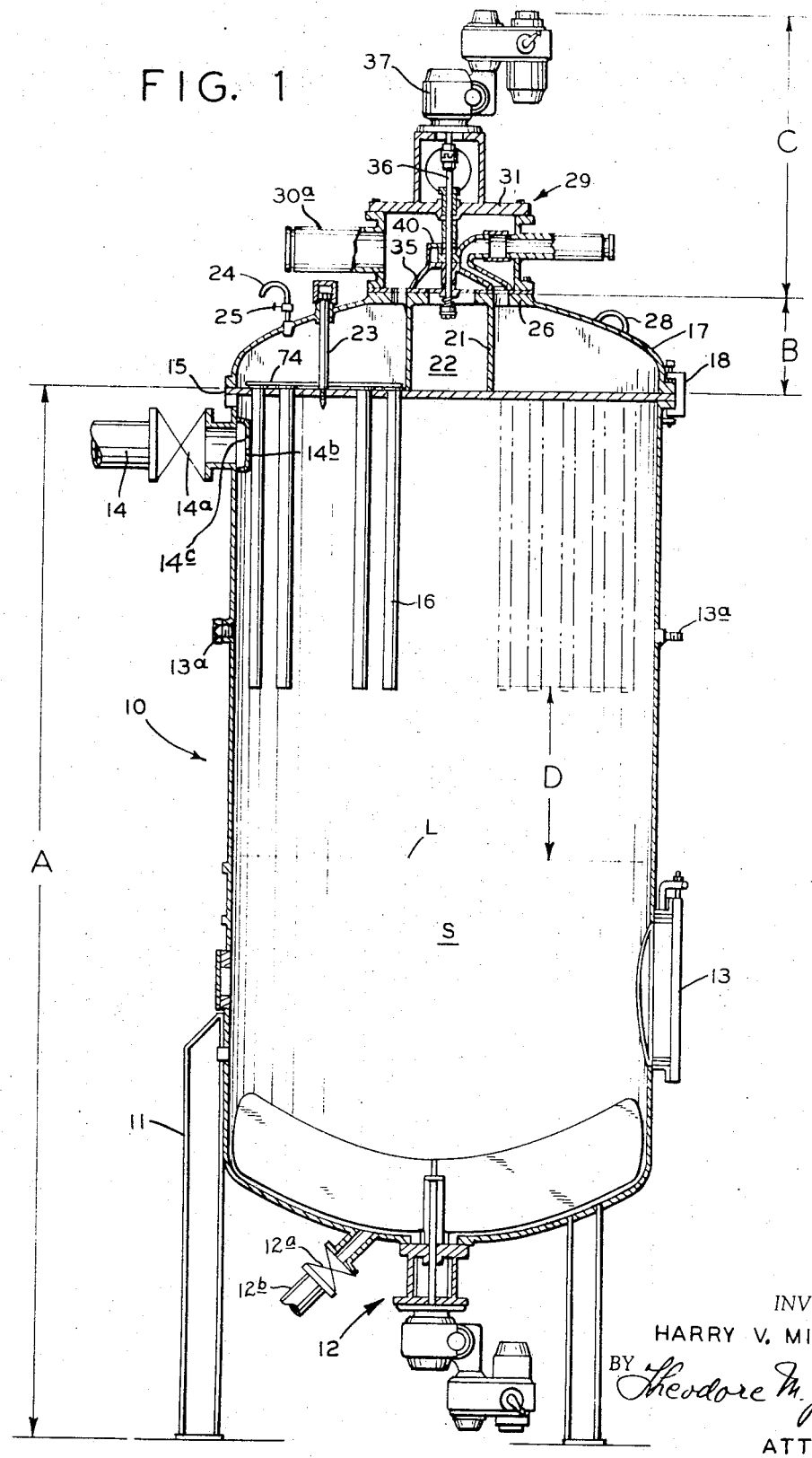
FIG. 1 is a vertical sectional view of the filtration-thickening unit embodying the invention, provided with the rotary valve conduit for backwashing the filter elements.

In the embodiment illustrated in FIG. 1 the filtration-thickening apparatus comprises three main sections A, B, C.

Section (A) of the apparatus comprises a cylindrical tank 10 supported on legs 11. In the tank bottom is mounted a variable-speed motor-driven agitator mechanism 12 for maintaining a bed S of heavy thickened sludge in a flowable condition for withdrawal through a control valve 12a provided in a discharge connection 12b. A lateral manhole 13 as well as various tap connections 13a are provided on the tank. A supply connection 14 with valve 14a for introducing the solids suspension to be thickened under pressure is provided near the top of the tank, delivering into a feed distributing conduit 14b which may extend peripherally along the inner surface of the tank, with discharge openings 14c spaced along this conduit.

The top end of the tank itself is closed by a plate member 15 to which are removably connected the upper ends of the numerous depending tubular filter elements 16 upon which a layer of suspension solids may be formed while filtrate liquid passes from the interior of these elements upwardly through the plate. The closed lower ends of the filter elements terminate a distance D from what is indicated to be the potential maximum level L of the bed of settled thickened sludge, that distance being adequate to allow for the lumps or fragmented layer of solids when released from the filter elements to fall onto or into the bed of sludge.

Figure 2:
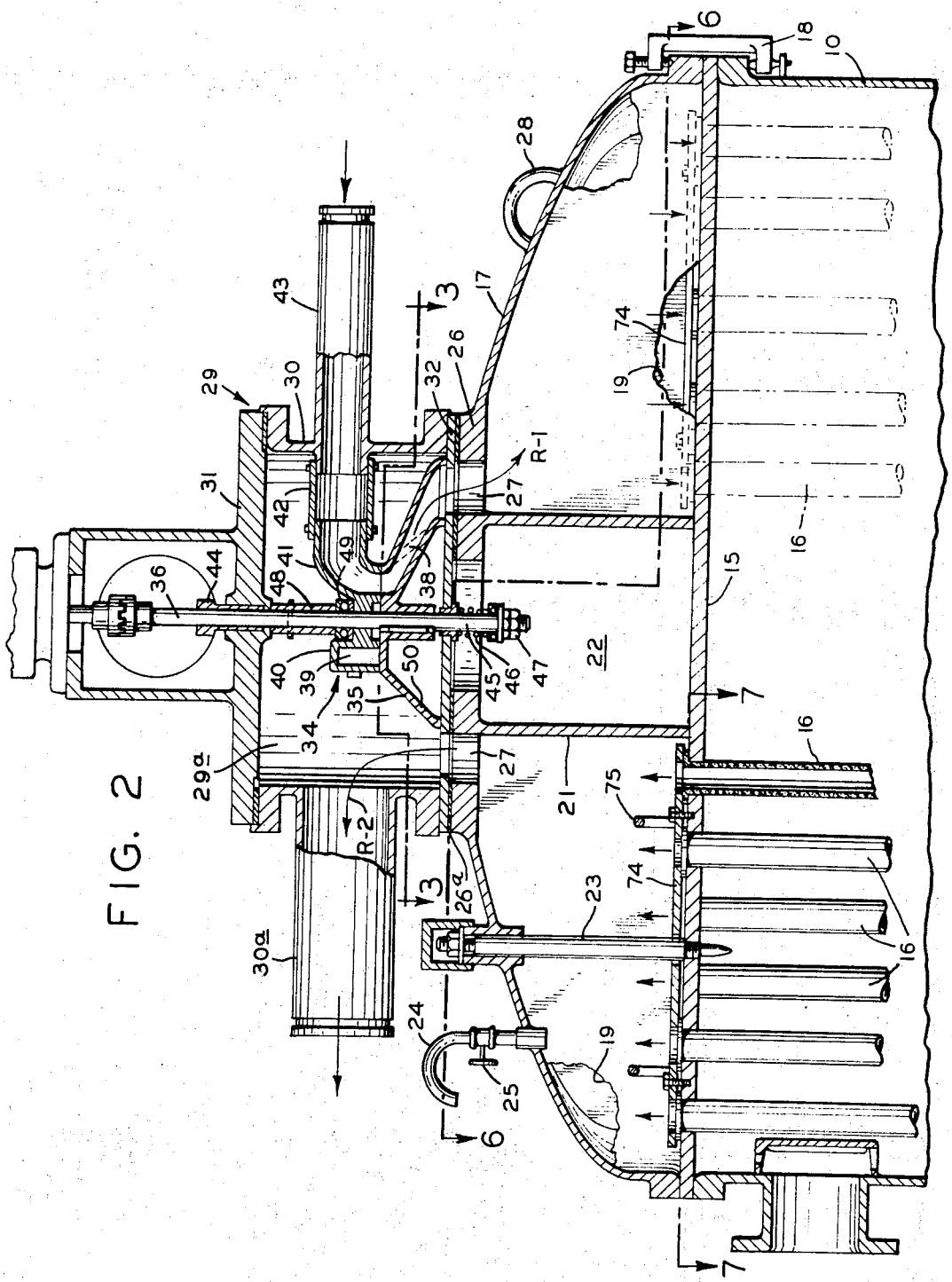
FIG. 2 is an enlarged view of the top end portion of the filter unit, more clearly showing the main components of the unit.
Figure 6:
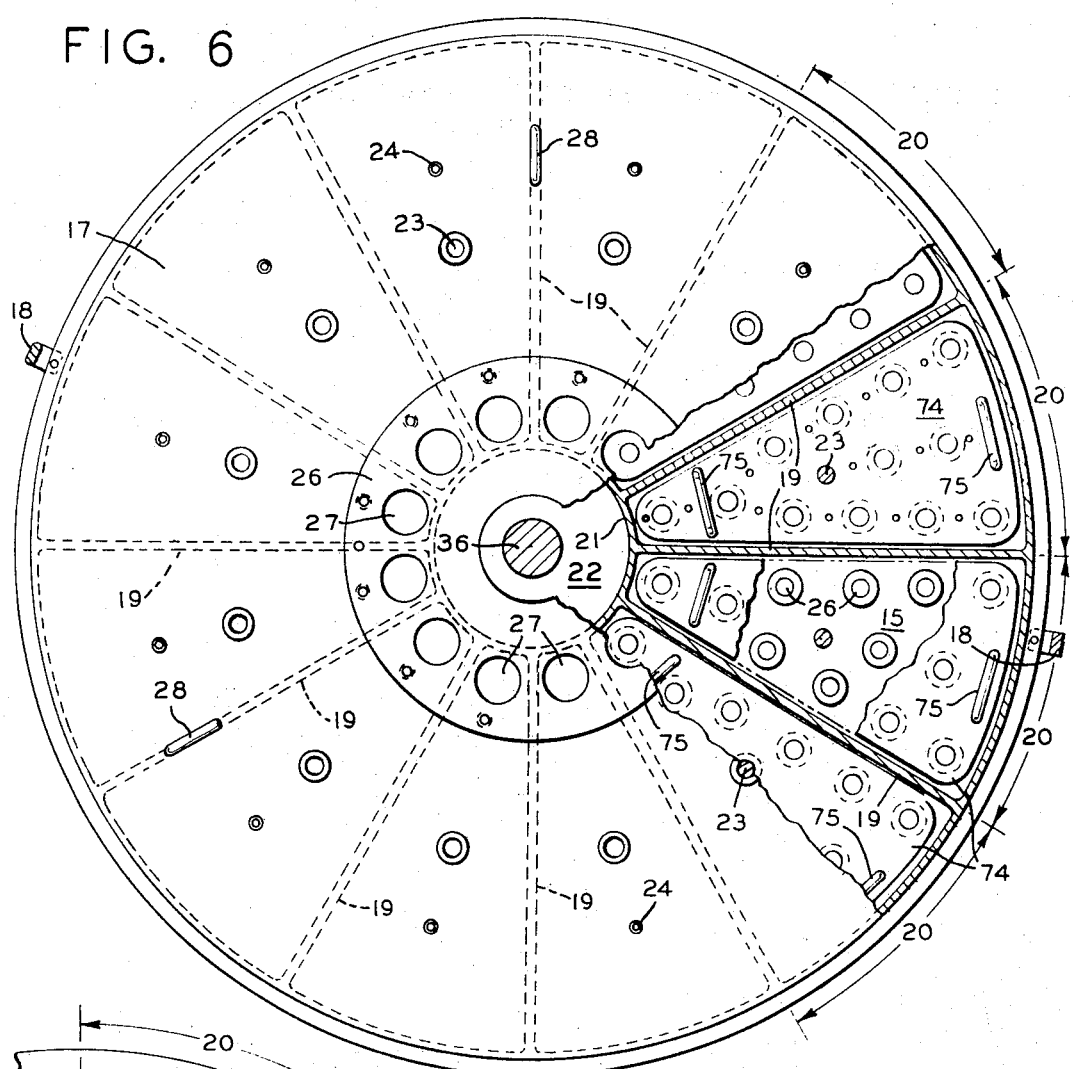
FIG. 6 is a cross-sectional view taken on line 6—6 of FIG. 2, illustrating the cover member of the filter unit, radially partitioned to provide sector-shaped filtrate receiving chambers.
Figure 7:
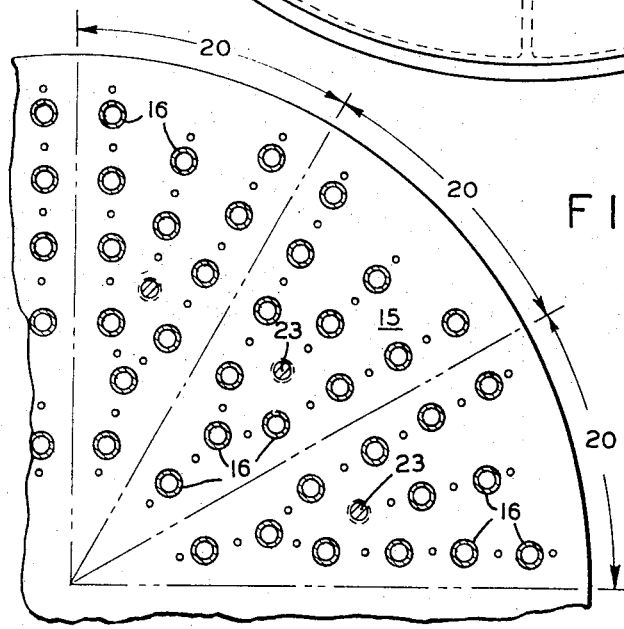
FIG. 7 is a partial cross-sectional view taken on line 7—7 in FIG. 2, illustrating the disposition of the tubular filter elements in the supporting tube plate.
Figure 11:
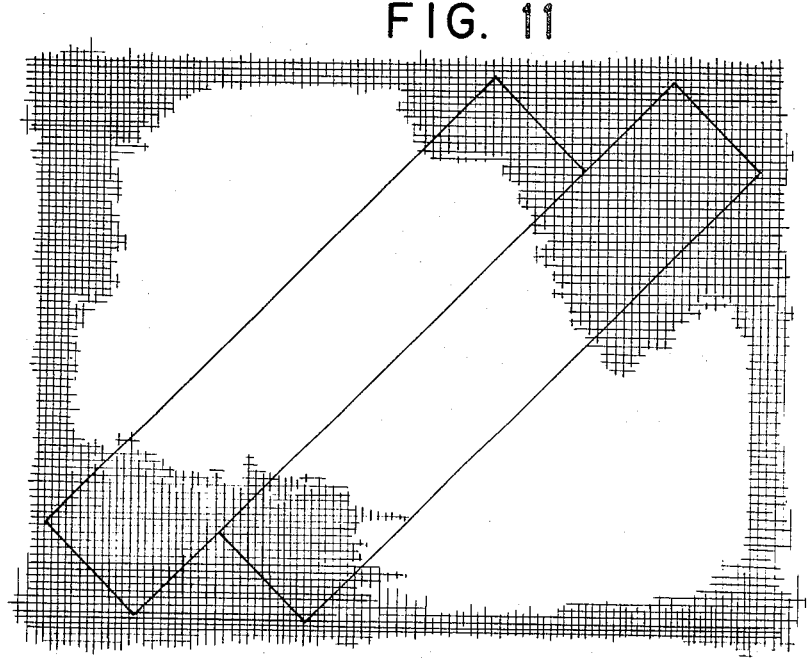
FIG. 11 illustrates a manner of preparing the blank strip of the filter cloth material of FIG. 10.

Section (B) of the apparatus comprises a hollow cover or dished cover member 17 overlying the plate member 15 and marginally fastened thereto and to the top end of the tank by means of quick removable screw clamps 18. This cover member 17 has internal radial partitions 19 defining with the plate member 15 a cluster of sector-shaped filtrate receiving chambers 20 (see FIG. 6) disposed around the vertical axis of the tank. The inner narrow ends of these receiving chambers are bounded by a cylindrical vertical wall or tubular partition 21 which itself defines a central chamber 22 (see FIGS. 2 & 6). The cover member 15, and the top end of the tank with the plate 15 between them are held tightly together by means of the screw clamps 18. The assembly and the relationship of the parts is such that the bottom edges of the radial partition means in the cover member close tightly upon the plate member 15.

Penetrating each filtrate receiving chamber 20 is a vertical anchoring bolt 23 for further securing the cover member and the bottom edges of the partition means tightly upon the plate member 15. Each chamber 20 further has a tap 24 with closure valve 25 through which the filtrate liquid from each of the chambers 20 may be sampled for testing of its clarity or turbidity as an indicator of possible defectiveness of any filter elements in the respective group served by the receiving chamber 20 being tested.

The dished and partitioned cover member 17 is formed at the top with a central horizontal plate portion 26 provided with ports 27, one for each chamber 20. These ports 27 are arranged in a circle around the vertical axis of the tank (see also FIG. 3), providing communication between each chamber 20 and the aforementioned filtrate collecting and backwashing section (C) mounted atop the cover member 17. This cover member further has external eyes 28 whereby the entire top assembly comprising sections (B) and (C) may be conveniently lifted off the tube plate 15 after removal of the screw clamps 18, for inspection of the filter elements. The mounting of the improved filter elements themselves and their particular construction will be described in more detail below.

In Section (C) a casing structure 29 for collecting the filtrate liquid from the chambers 20 provides a filtrate collecting chamber 29a, and is here shown to comprise a cylindrical body portion 30 having a filtrate discharge connection 30a and a top cover plate 31 fastened thereto. A wear plate 32 at the bottom of this casing structure is here indicated as part of section (C). This plate is interposed between the bottom face of casing structure 29 and the top face of cover member 17, the parts being bolted together tightly in face-to-face relationship to one another. The wear plate has ports 33 of trapezoidal shape (see FIG. 3) in general registering with ports 27 in the cover member 17.

Within the casing structure 29 or filtrate collecting chamber 29a is mounted a distributing mechanism 34 operable to supply a reverse flow of backwash pressure liquid, preferably the filtrate liquid itself, sequentially to the chambers 20 in repetitious cycles. One of the chambers 20 at a time, and the group of filter elements communicating therewith are subjected to backwashing, while the other groups of filter elements as defined by the other chambers 20, are being subjected to pressure filtration.

The mechanism 34, according to the present example, comprises a rotary conduit member or rotary valve 35 fixed to a vertical shaft 36 actuated as by motorized variable speed drive means 37 for rotating the conduit member so that an inclined radial conduit passage 38 in valve member 35 is placed in flow communication sequentially with chambers 20 for passing backwash liquid downwardly thereto as indicated by arrows R-1, while filtrate liquid passes upwardly in the direction of arrow R-2 from those other chambers 20 not communicating with the backwash conduit passage 38. This passage while rotating communicates at all times with an inverted annular supply channel 39 formed by a stationary annular header 40 surrounding the shaft and having planar face-to-face contact with the top face of the rotary conduit member 35. This annular header has a neck 41 communicating through a flexible tubular joint 42 with an inlet 43 which is part of casing structure 29.

The vertical shaft 36 is keyed or splined to the conduit member and slideable therein to a small extent while rotating freely in the annular header 40. The shaft extends upwardly through the top plate 31 by way of a suitable seal or stuffing box 44. This shaft has a lower end portion 45 projecting through wear plate 32 into the central chamber 22. A compression coil spring 46 surrounding this lower shaft end portion is confined between stop nuts 47 and the wear plate 32, urging the annular header 40 into planar operating contact with the rotary conduit member, and the conduit member 35 into planar operating contact with the wear plate 32. The spring pressure is thus effective through a sleeve 48 fixed on the shaft, acting on a vertical thrust ball bearing 49.

Figure 3:
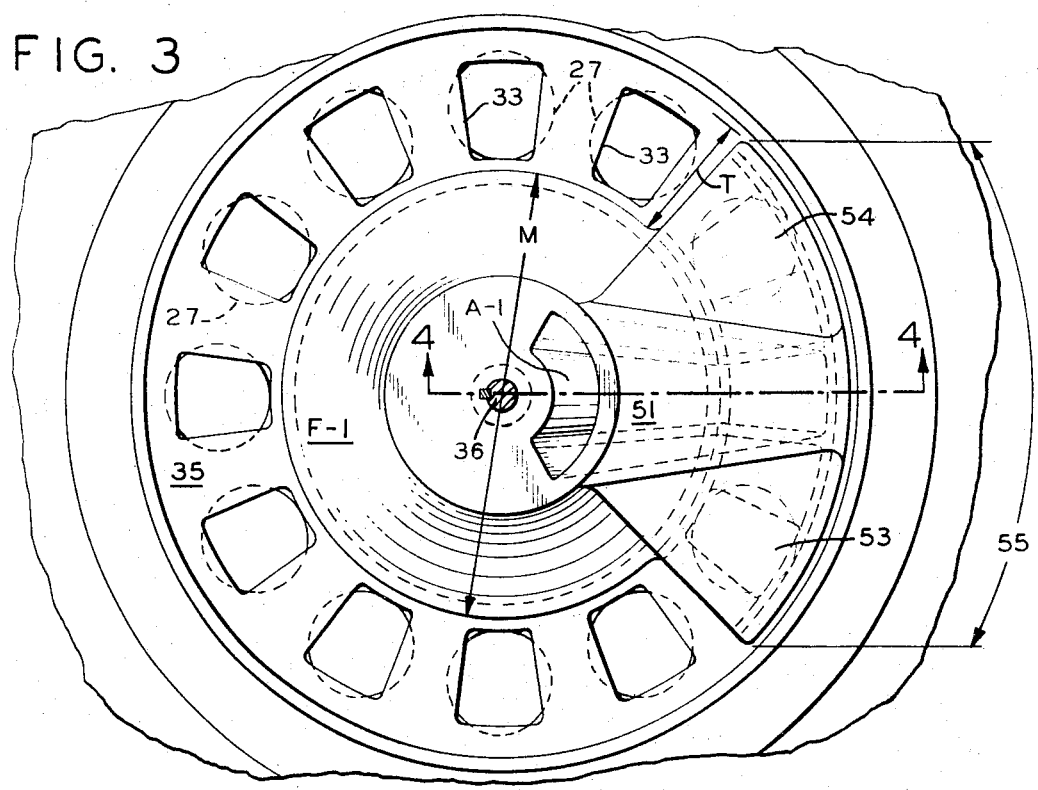
FIG. 3 is a cross-section taken on line 3—3 of FIG. 2, showing the rotary valve conduit and associated flow passages.
Figure 5:
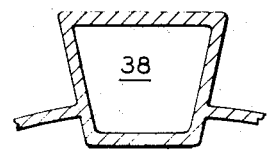
FIG. 5 is a detail cross-section of the valve conduit, taken on line 5—5 in FIG. 4.
Figure 4:
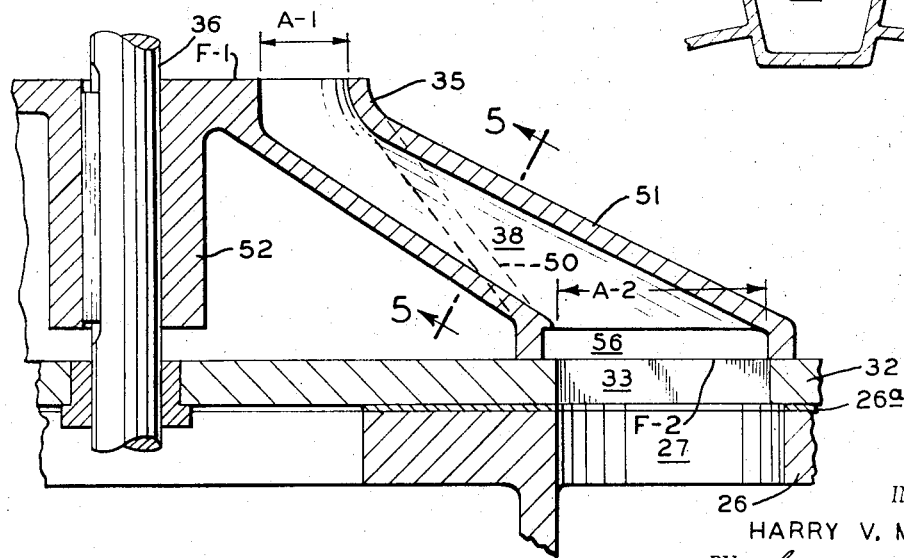
FIG. 4 is a part-sectional view taken on line 4—4 in FIG. 3, further illustrating the function of the rotary valve conduit.

The rotary flow conduit member as shown in the embodiment of FIGS. 3 and 4 has smoothly machined parallel top and bottom faces F-1 and F-2 respectively, in operating contact with similarly treated faces of the annular header 40 and the wear plate 32. This rotary conduit member or casting comprises a basic shape or body portion in the form of a hollow trunco-conical body 50 (see also FIGS. 2 and 3) open at the bottom but closed at the top except for the inlet opening of an inclined flow conduit portion 51 interrupting the basic trunco-conical shape. The inclined conduit itself has an inflow area A-1 and an outflow area A-2. Internally the trunco-conical hollow body portion is formed with a hub portion 52 keyed or splined to shaft 36, so as to be slideable therein to a small extent.

From the top plan view of the conduit member in FIG. 3 it will be seen that the inclined conduit portion 51 therein juts out a distance (T) beyond the base diameter M of the trunco-conical body portion. Horizontal arcuate wing portions 53 and 54 extend laterally in opposite directions from the lower end of the conduit portion 51, the wing portion being integral also with the bottom end of the trunco-conical shape. These wing portions together with the conduit portion 51 form a radially projecting arcuate portion 55 (see FIG. 3). The wing portions 53 and 54 serve as blank-off portions effective to allow for shifting of the valve conduit from one port 33 to the next without short-circuiting.

A preferred embodiment of the improved filter element is described as follows by reference to FIGS. 8 to 14.

The embodiment in FIG. 8 shows that the filter element comprises a rigid tube 65 of substantial wall thickness, consisting of a porous liquid-permeable material, for example a porous polypropylene material largely resistant to the effect of chemicals and the effect of heat. The upper end of this porous tube has fixed thereto a flange 65a, while the lower end is closed by an end piece 66 bonded to the tube and having perforations 67.

Surrounding the porous tube is a sleeve 68 of filter media material or cloth, prepared so as to be stretchable in a transverse as well as longitudinal direction. The lower end of this sleeve is closed by a seam or stiching 69, thus forming a small downwardly pointed pocket 70 below the lower end of the porous tube.

This filter sleeve has an upper end portion in the form of a bead 71 formed in a special manner provided for by this invention, and constituting an outwardly overhanging rim. The bead comprises a relatively rigid ring 72 in the form of an O-ring, that is a ring of circular cross-sectional profile. This rigid ring consisting of a substantially non-compressible material or plastic is enveloped by the upper end portion of the filter cloth in such a manner that the cloth is stretched or expanded around the ring, and then turned inwardly over the ring, thus terminating within the sleeve. The turned-in portion of the filter material is fastened as by stiches 73 to the adjoining portion of the filter sleeve material 73a, that is peripherally along a line below and close to the bead.

When the filter element is mounted and in place in the above described pressure filter unit, the bead portion of the filter sleeve (see FIG. 8) is confined between the tube plate 15 and the flange 65a of the porous tube, both the bead portion of the sleeve and the flange being in turn pressed down by a retainer plate 74 bolted to the tube plate 15.

Turbidity of the filtrate liquid due to leakage from the filtration zones through the tube plate is prevented by the sealing effect of the filter cloth enveloping the ring preferably consisting of a non-compressible composition material or plastic. From the greatly enlarged detail showing of the bead in FIG. 8a it may be seen that any leakage through the space between the tube plate and the ring is prevented by the action of the interposed compressed filter cloth material enveloping the ring. Leakage through the space between the ring and flange 65a of the porous tube is similarly prevented by the action of the interposed filter cloth material.

Optimum sealing effect is attainable at the upper point P-1 and the lower point P-2 due to what may be roughly considered as line contact pressure relationship at the top and at the bottom of the ring.

For purposes of this invention, the filter sleeve is stretchable in both directions, that is transversely as well as longitudinally. Such two-way stretchability is attainable by providing a strip or blank 75 of filter cloth material (see FIG. 10) wherein the threads of the weave are oriented in a diagonal direction. That is to say, the threads between themselves intersect at an angle of about 45° with the longitudinal edges E-1 and E-2 of this strip of filter cloth.

This strip of filter cloth material is formed or rolled into a tube or sleeve S-1 (see FIG. 9) with a longitudinal seam or seams S-2 interconnecting the overlapping longitudinal edge portions E-3 and E-4 of the filter cloth. In this way, the threads of the weave now become spirally oriented relative to the axis of the sleeve, while the lower end of the sleeve is closed by the aforementioned transverse seam 69.

Figure 12:
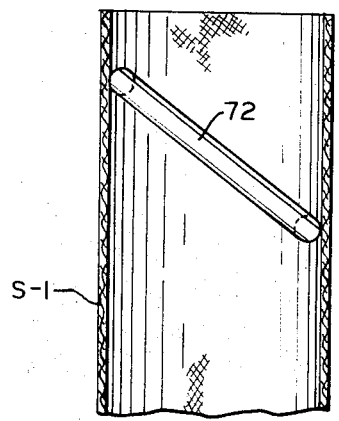
FIGS. 12, 13, 14 illustrate phases of progression in the preparation of the beaded end of the filter sleeve.
Figure 13:
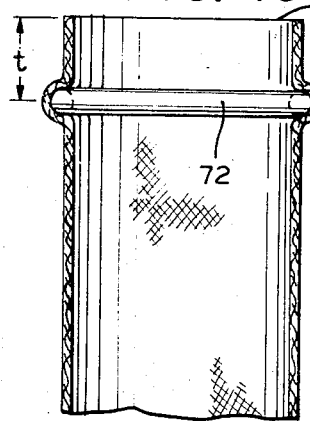
Figure 14:
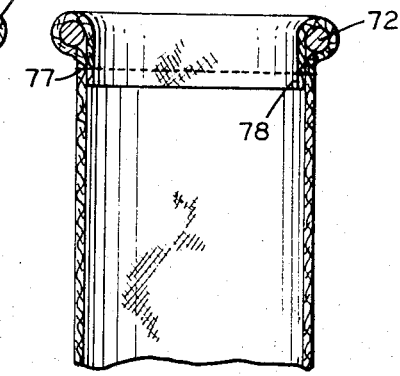

FIGS. 12, 13, and 14 illustrate the procedure whereby the beaded end portion is formed upon the upper end of the partly finished filter sleeve of FIG. 9.

A first phase of the procedure shown in FIG. 12 is the inserting of the ring 72 into the upper end portion of the partly finished filter sleeve.

A second phase as shown in FIG. 13 is the levelling of the ring within the sleeve to a horizontal position, or a position transversely of the axis of the sleeve. This involves expanding the sleeve material so that it will form an annular outward bulge 76 accommodating therein the ring a distance "*t*" from the top edge 76*a* of the sleeve. A third phase shown in FIG. 14 involves turning the upper free non-expanded end portion of the filter cloth material inwardly through the ring, and fastening or stitching the turned-in portion in place as indicated by a peripheral seam 77 located below and close to the ring, thus fully enveloping the ring in the filter cloth material. In this way, the bead portion represents an outwardly directed annular overhang.

The finished filter sleeve or sock may then be slipped onto, or pulled over the porous tube, with the turned-in end portion 78 of the material offering no obstruction. This assembly of a filter element including the porous tube 65 and the sleeve S-1, is then inserted through a respective hole in the tube plate 15 of the filter unit, with the outer continuous face of the sleeve material allowing for smooth insertion. The retainer plate 74 is then applied and bolted to the tube plate, rendering the sealing points P-1 and P-2 (see FIG. 8*a*) effective in all the connections of the filter elements covered by this retainer plate.

I claim:

1. In a pressure filter of the type having depending tubular filter elements exposed to a pulp to be filtered under pressure, and delivering filtrate liquid from the upper open end,
   the combination which comprises a horizontal tube plate having holes for the insertion therein of tubular filter elements,
   a filter element inserted in said tube plate, which comprises a liquid-permeable rigid tube having an upper open end provided with a flange,
   a filter sleeve having a closed end and an open end, surrounding said tube, and consisting of a filter media constructed and arranged so as to be radially expandable from its normal diameter,
   a ring of substantially non-deformable material, said ring having an inner diameter substantially equal to the diameter of the sleeve, inserted into said open end so that said media is stretched radially about said ring, accommodating the ring in a plane perpendicular to the longitudinal axis of the sleeve, the unstretched open end portion of the sleeve being turned inwardly through said ring, and connected peripherally to the adjoining surrounding portion of said sleeve thus forming an annular outwardly overhanging terminal bead at said open end, confined between said tube plate and said flange,
   retainer means engaging the top side of said flange, and means for securing said retainer means relative to said tube plate whereby said bead is compressed in such a manner that the filter media enveloping said ring provides a pair of annular compression seals effective between said ring and said tube plate, and between said ring and said flange respectively.

2. The combination according to claim 1, wherein the filter sleeve material comprises a length of filter fabric having longitudinal edges, with the threads of the weave intersecting substantially at right angles, but oriented diagonally to said edges, said edges being interconnected to constitute said sleeve.

3. The combination according to claim 1, wherein the filter sleeve material consists of a weave having threads normally intersecting substantially at right angles, but extending in a spirally oriented direction relative to the axis of the longitudinal filter element, whereby said filter sleeve is rendered radially expandable.

4. The combination according to claim 1, wherein said ring is of circular cross-sectional profile, whereby the compression effective in said annular seals is concentrated along a relatively narrow annular zone.

5. The combination according to claim 1, wherein said retainer means comprises a retainer plate, constructed and arranged for securing a plurality of said filter elements.

6. A tubular filter element which comprises a liquid permeable rigid tube having an upper open end provided with a flange,
   a filter sleeve having a closed end and an open end, surrounding said tube, and consisting of a filter media constructed and arranged so as to be radially expandable from its normal diameter,
   a ring of substantially non-deformable material, having an inner diameter substantially equal to the diameter of the sleeve, inserted into said open end so that said media is stretched radially about said ring, accommodating the ring in a plane perpendicular to the longitudinal axis of the sleeve, the unstretched open end portion of the sleeve being turned inwardly through said ring, and connected peripherally to the adjoining surrounding portion of said sleeve, thus forming an annular outwardly overhanging terminal bead adjoining said flange.

7. The filter element according to claim 6, wherein the filter sleeve material consists of a weave having threads normally intersecting substantially at right angles, but extending in a spirally oriented direction relative to the axis of said filter element, whereby said filter sleeve is rendered radially expandable.

8. The filter element according to claim 6, wherein said ring is of circular cross-sectional profile.

9. The filter element according to claim 6, wherein the filter sleeve material comprises a length of filter fabric having longitudinal edges, with the threads of the weave intersecting substantially at right angles, but oriented diagonally to said edges, said edges being interconnected to constitute said sleeve.

10. The method of making a filter sleeve for the prupose substantially such as herein described, which comprises,
    providing a length of filter cloth that is stretchable transversely of its longitudinal extent,
    interconnecting the longitudinal edge portion of said length of filter cloth in such a manner as to form a tubular shape representing a partly finished sleeve,
    closing one end of said tubular shape,
    providing a ring of substantially non-deformable material, and having an inner diameter substantially equal to the diameter of the sleeve,
    inserting and positioning said ring in the open end of said partly finished sleeve, whereby said filter cloth is radially stretched to accommodate said ring in a plane extending transversely of said sleeve, turning the unstretched free end portion of the filter cloth inwardly through the ring, and connecting said turned-in portion peripherally to the adjoining surrounding portion of the sleeve, so that there is formed a bead radially outwardly overhanging from said filter media.

11. The method according to claim 10, wherein said length of filter cloth is provided from a larger piece of cloth having a weave wherein the threads intersect at right angles, by cutting said cloth on the bias relative to the direction of said threads, and interconnecting the longitudinal edges of said cloth.

12. A filter sleeve having an open top end and a closed bottom end, adapted to be fitted over a liquid permeable rigid tube, and to be subjected to external liquid filtration pressure, said filter sleeve consisting of a filter fabric having a weave of threads normally intersecting substantially at right angles, but extending in a spirally oriented direction relative to the longitudinal axis of the sleeve, whereby said sleeve is radially expandable beyond its normal diameter, a circular uninterrupted ring member consisting of substantially non-deformable material, having an inner diameter substantially equal to the diameter of the sleeve, inserted into said open end of the ring so that the fabric expands hugging said ring in an annular bulge extending in a plane perpendicular to the longitudinal axis of the sleeve, and formed between the directly adjoining unexpanded portions of the sleeve, the unstretched open end portion of the sleeve being turned inwardly through said ring, and connected peripherally to the thus adjoining unexpanded surrounding portion of said sleeve, to constitute a continuous beaded flange, the diameter of the annular center line of said ring being substantially greater than the outside diameter of the sleeve, and large enough to provide mutually opposed unbroken annular transverse sealing faces of sleeve material at the top and at the bottom of said beaded flange.

13. The filter sleeve according to claim 12, wherein the filter sleeve material comprises a length of filter fabric having longitudinal edges, with the threads of the weave intersecting substantially at right angles, but oriented diagonally to said edges, said edges being interconnected to constitute said sleeve.

14. The filter sleeve according to claim 12, wherein said ring member is of circular cross-sectional profile.

* * * * *